United States Patent

Emels

[15] 3,705,567

[45] Dec. 12, 1972

[54] DEVICE FOR INDIFFUSSING DOPANTS INTO SEMICONDUCTOR WAFERS

[72] Inventor: Reimer Emels, Ebermannstadt, Germany

[73] Assignee: Siemens Aktiengesellschaft, Berlin, Germany

[22] Filed: Jan. 22, 1971

[21] Appl. No.: 108,700

[30] Foreign Application Priority Data

July 6, 1970 Germany........................P 23 33 44.5

[52] U.S. Cl.........................................118/49, 118/50

[51] Int. Cl................................................C23c 13/12

[58] Field of Search.........................118/48–49.5, 50, 118/50.1; 148/174, 175; 117/106–107.2

[56] References Cited

UNITED STATES PATENTS

| | | | |
|---|---|---|---|
| 3,202,485 | 8/1965 | Armington et al. | 118/49.1 X |
| 3,293,074 | 12/1966 | Nickl | 118/49.5 X |
| 3,367,303 | 2/1968 | Bostic et al. | 118/49.5 X |
| 3,371,995 | 3/1968 | Pultz | 117/106 R X |
| 3,394,390 | 7/1968 | Cheney | 148/175 X |
| 3,472,684 | 10/1969 | Walther | 118/48 X |
| 3,486,933 | 12/1969 | Sussmann | 117/106 A X |
| 3,492,969 | 2/1970 | Emeis | 118/49.1 |

*Primary Examiner*—Morris Kaplan
*Attorney*—Curt M. Avery, Arthur E. Wilfond, Herbert L. Lerner and Daniel J. Tick

[57] ABSTRACT

A silicon ampule is provided at its open end with a planar ground section, to which is pressed with the aid of a vacuum pump, a quartz tube provided with a planar ground section. Porosity caused through various thermal expansion coefficients, or thermal stresses does not occur, therefor. The silicon tube is carried only by the quartz tube and does not contact with any other material. To prevent the possible penetration of foreign substances, the planar ground section is rinsed from the outside with a protective gas. According to another embodiment, a lid provided with a planar ground section is placed upon the vertically positioned tube, after the tube was rinsed with protective gas.

7 Claims, 3 Drawing Figures

DEVICE FOR INDIFFUSSING DOPANTS INTO SEMICONDUCTOR WAFERS

Figure 1:
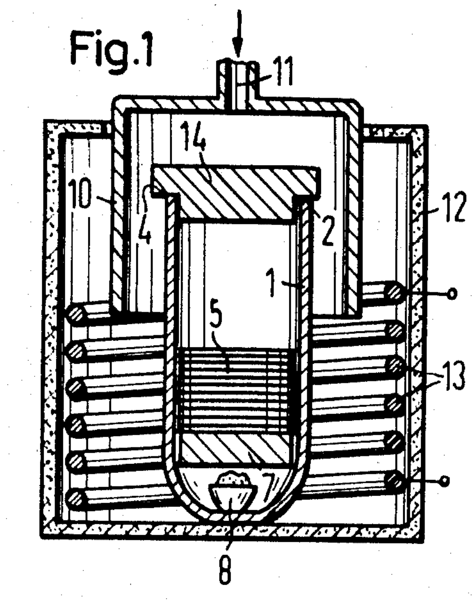

The present invention relates to a device for indiffusing dopants into semiconductor wafers with a heatable tube of the same semiconductor material, which is open on at least one side, wherein the wafers are heated to a temperature necessary for indiffusion.

Such a device is already known. It can preferably be used for doping wafers of semiconductor materials, since tubes of semiconductor material, for example silicon, tolerate considerably higher temperatures than the conventional quartz tubes. This permits the diffusion at higher temperature than in quartz tubes thereby considerably reducing the diffusion time. Such a device also has the advantage that the semiconductor wafers may be contacted with the tube without the result, contrary to use, for example, a quartz tube, that such action will produce undesired contamination of the semiconductor wafers and a reaction between the quartz tube and the semiconductor wafers.

To effect diffusion in a quartz tube, after installation of the semiconductor wafers and of the doping material, the tube is evacuated and is fused gas tight. This prevents impurities and the oxygen which oxidizes the dopant as well as the semiconductor wafers, from penetrating into the quartz tube. At a temperature of approximately 1,200°, the quartz tube becomes soft and is compressed by outside air pressure, so that the semiconductor wafers may become bent and tensioned. These occurrences lead to errors in the crystal lattice of the essentially monocrystalline wafers, which affects the operational qualities of the subsequent component. Therefore, support discs are arranged in the interior of the quartz tubes which prevent compression of the quartz tube. This, however, wastes considerable useful space in the interior of the quartz tube. Tubes of semiconductor material are still mechanically stable and do not, therefore, require the afore-mentioned support discs. Tubes of semiconductor material, however, in contrast to the quartz tubes, can be sealed gas tight only with great difficulties.

The present invention has as its object to develop a device of the indicated type to that extent that a satisfactory, easy sealing of tubes of semiconductor material is possible against the penetration of impurities and oxygen, during all conditions of operation.

The invention is characterized by the fact that on its open side, the tube has a planar polished or ground section which runs at least almost perpendicularly to its axis, a sealing means provided with another planar polished section; that both planar polished or ground sections are superimposed and that means are available which produce a pressure which compresses the two planar ground sections against each other.

The tube is preferably situated with its open side pointing upward or downward, and the seal is defined by a lid. The pressure exerting means may constitute the force of gravity which acts against the tube. Beneficial conditions are obtained when at least the planar ground section of tube and lid are within another tube which is traversed by a protective gas. The seal may also be formed by a lid, covering an opening whereby the opening is connected gas tightly with a suction tube. The system, in this instance, comprises a suction device which is connected with the suction tube and which produces a vacuum in the suction tube and in the tube. The seal can preferably be just a suction tube with a planar ground section, which runs at least almost perpendicularly to its axis and which is seated upon the ground section of the tube. Here too, the means comprises a suction device connected with the suction tube producing a vacuum in the suction tube and in the tube. When the tube, for example, consists of silicon and the suction tube of quartz, it is preferable that the ground sections and the suction tube have a lower temperature than those regions of the tube which are located in the semiconductor wafers. Here, too, the ground sections can be inserted into another tube which is traversed by protective gas.

Figure 2:
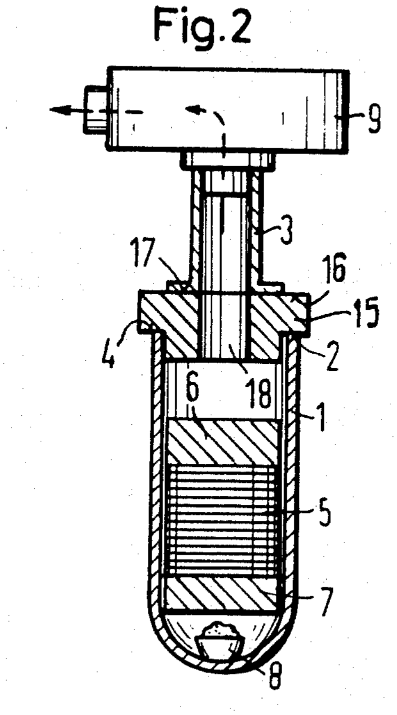
Figure 3:
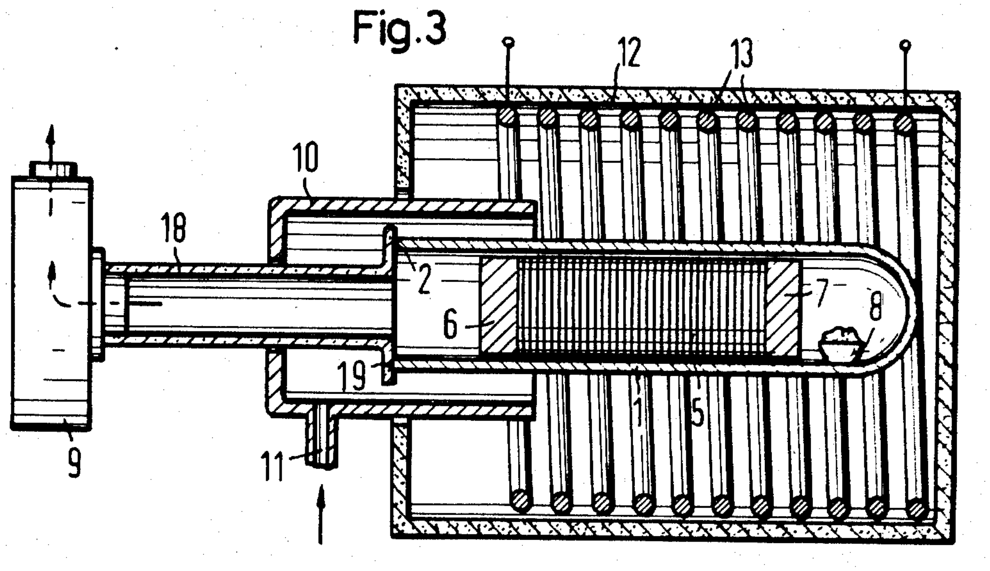

The invention is disclosed in greater detail with respect to the Drawing, wherein:

FIGS. 1 to 3 illustrate three embodiment Examples.

FIG. 1 illustrates a tube 1 of semiconductor material, for example silicon. This tube has a planar ground section 2, at its upper end and an open rim upon which rests lid 14. The surface of the lid 14, which bears upon the planar ground section 2, also has a planar section 4. Semiconductor wafers 5 are stacked in the tube 1 and are supported by a sealing disc 7. This sealing wafer 7 is not exactly fitted to the inside diameter of the tube 1 so that the dopant contained in a dopant source 8 can reach the semiconductor wafers 5. The tube 1 and the lid 14 are located in a diffusion furnace 12, which is provided with a heating coil 13, which is only schematically indicated. The upper part of the tube 1 is situated in a further tube 10 which is provided with an inlet nozzle 11.

In preparation of the diffusion process, the doping source 8, the sealing disc 7 and the semiconductor wafers 5, are placed into the interior of the tube 1. The tube 1 is sealed by lid 14, which, by its weight via the planar ground sections 2 and 4, seals the tube interior. The inside of the tube 1 is preferably rinsed with an inert gas, prior to the application of the lid, in order to remove the oxygen which is present in the tube. An inert gas is blown, preferably via nozzle 11, into the tube 10 and rinses the planar ground sections 2 and 4, thereby reliably eliminating the penetration of impurities or oxygen. The inert gas which escapes from the lower end of the tube 10, may escape to the outside via the interior of the diffusion furnace 12. These circumstances permit a diffusion whose quality will not be impaired through any kind of outside influences.

FIG. 2 shows another embodiment example. Equal parts are indicated thereby with the same numerals as in FIG. 1. The diffusion furnace with the heating coils was omitted here for simplification. On its upper, open side, the semiconductor tube 1 has a planar ground section 2, upon which rests lid 15. The faces of this lid 15, which rest upon the planar ground section 2 of the tube 1, are also designed as a planar ground section. The side of lid 15, facing away from the tube 1, is provided with a planar ground section 16, upon which bears a suction tube 3. The lower end of suction tube 3 is provided with a planar ground section 17.

The interior of the tube 1 is connected, via an opening 18 in the lid 15, through the interior of suction tube 3, with a suction device 9, which is only schematically shown. After installation of the doping source 8, the sealing disc 7 and the semiconductor wafers 5, and another sealing disc 6, the lid 15 with its ground section 4, is seated upon the ground section 2 of the tube 1. Thereafter, suction tube 3 is seated upon the lid 15. Thereupon, the suction device 9 is set into operation to produce a vacuum in the interior of the system that comprises a tube 1, a lid 15 and the suction tube 3. As a result, the planar sections 2, 4, 16 and 17 are pressed upon each other and the tube 1 is sealed to the outside. If impurities or oxygen should still penetrate into the interior of the tube 1, they will also be drawn off, to a great extent, by suction device 9. The additional sealing disc 6 has a somewhat smaller area than the inner space of the tube 1. This disc should not be so small, however, that the suction device can suction off most of the dopant, but should have also a throttling effect.

For a further improvement of the device, the planar ground sections 2, 4, 16 and 17 could lie in a tube, similar to tube 10 shown in FIG. 1, through which inert gas is blown. This inert gas rinses the planar ground sections and thus insures, with reliability, that detrimental materials will not penetrate into the tube 1.

When the suction tube 3 consists of quartz, it is recommendable to heat only that part of semiconductor tube 1 to diffusion temperature, wherein the semiconductor wafers 5 are located. This prevents the suction tube 3 from becoming soft and being compressed by the outside air pressure. An excessive heating of the suction tube 3 may be avoided through the fact, by placing tube 3 outside the furnace, while placing only the semi-conductor tube 1 within the diffusion furnace. However, a diffusion furnace with an appropriate temperature gradient such as indicated in FIG. 1, can also be used. This is because the heating coils 13 are located only in the lower portion of the diffusion furnace 12. A tube of aluminum oxide $Al_2O_3$ can also be used as a suction tube.

FIG. 3 shows another embodiment where the same parts have the same reference numbers as in FIGS. 1 and 2. In the device shown in FIG. 3, the tube 1 no longer has a lid, but rather a suction tube 18 is placed directly upon the planar ground section 2 of the tube 1. On its surface, which bears against the planar section 2 of the tube 1, the suction tube 18 has a planar or ground section 19. The device of FIG. 3 also differs from FIG. 2 in being arranged horizontally. Consequently, sealing disc 6, arranged in the semiconductor tube 1, both prevents the semiconductor wafers from falling over and has the above-indicated throttling effect. Naturally, the device of FIG. 3 can also be operated in vertical position. Conversely, the device, according to FIG. 2, may be turned in horizontal position. The vertical position, however, has the advantage that each tilting of the semiconductor wafers and thus possible errors in the crystal lattice of the semiconductor wafers, is prevented.

The planar ground sections which are used according to the invention, have the characteristic that during the heating up of the mating tubes of generally different thermal expansion coefficients, no forces acting in the radical direction, are transmitted to the semiconductor tube. In this sense, a slightly conical, and as such, planar ground section is useful also, whose plane deviates only a few degrees from a right angle, with respect to the longitudinal axis of the tube. It is just as possible to use a spherical ground section in place of the slightly conical one. Planar grinding and conical grinding can both be considered as species instances of spherical grinding with a radius of curvature going toward infinity.

I claim:

1. In a device for indiffusing dopants in semiconductor wafers, with a heatable tube of the same semiconductor material, said tube being open on at least one end and adapted for containing the wafers which are heated to indiffusion temperature, a ground section on the open end of said tube and a sealing means comprising another ground section, said ground sections being matable, said seal being formed through a lid which is provided with an opening that is connected gas tightly with a suction tube and a suction device connected with the suction tube to produce a vacuum in said suction tube whereby said tube for containing the wafers is supported in space when the vacuum is applied.

2. The device of claim 1, wherein the tube is of silicon and the suction tube is of quartz or aluminum oxide.

3. The device of claim 2, having means whereby the ground sections and the suction tube are at lower temperature than that portion of the tube where the semiconductor wafers are located when the device is in operation.

4. The device of claim 3, wherein at least that portion of the tube wherein the semiconductor wafers are located is situated within a furnace.

5. The device of claim 4, whereby the tube is positioned perpendicularly.

6. The device of claim 5, wherein at least the ground sections are enclosed by another tube through which a protective gas flows.

7. The device of claim 6, wherein a sealing disc is provided in the tube on the side facing the suction means, said sealing disc acting as a throttle for a dopant, when in operation.

* * * * *